United States Patent
Mathew et al.

(10) Patent No.: US 9,578,325 B2
(45) Date of Patent: Feb. 21, 2017

(54) DRIFT REDUCTION FOR QUALITY SCALABLE VIDEO CODING

(75) Inventors: Manu Mathew, Bangalore (IN); Sumit Kandpal, Uttarakhand (IN)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 1023 days.

(21) Appl. No.: 13/005,665

(22) Filed: Jan. 13, 2011

(65) Prior Publication Data

US 2013/0230095 A1    Sep. 5, 2013

(30) Foreign Application Priority Data

Jan. 13, 2010 (IN) .............. 89/CHE/2010

(51) Int. Cl.
| | |
|---|---|
| H04N 7/26 | (2006.01) |
| H04N 19/36 | (2014.01) |
| H04N 19/66 | (2014.01) |
| H04N 19/33 | (2014.01) |
| H04N 19/31 | (2014.01) |

(52) U.S. Cl.
CPC ........ H04N 19/00448 (2013.01); H04N 19/66 (2014.11); H04N 19/31 (2014.11); H04N 19/33 (2014.11)

(58) Field of Classification Search
CPC .............. H04N 19/00448; H04N 19/0086; H04N 19/0043; H04N 19/00436; H04N 19/33; H04N 19/31; H04N 19/66
USPC ...................................... 375/240.02
See application file for complete search history.

(56) References Cited

U.S. PATENT DOCUMENTS

| | | | |
|---|---|---|---|
| 6,072,831 A * | 6/2000 | Chen | 375/240.03 |
| 2007/0291836 A1* | 12/2007 | Shi et al. | 375/240.01 |
| 2009/0041130 A1* | 2/2009 | Yoon et al. | 375/240.26 |
| 2009/0147857 A1* | 6/2009 | Park et al. | 375/240.25 |
| 2011/0122945 A1* | 5/2011 | Li et al. | 375/240.12 |
| 2011/0134994 A1* | 6/2011 | Lu et al. | 375/240.02 |

FOREIGN PATENT DOCUMENTS

WO   WO 2010011295 A1 * 1/2010

OTHER PUBLICATIONS

Han et al. "Robust and Efficient Scalable Video Coding With Leaky Prediction". IEEE ICIP 2002, pp. 41-44.*
Kamp et al. "Quality Scalable Low Delay Video Coding using Leaky Base Layer Prediction". 2007 International Symposium on Communications and Information Technologies (ISCIT 2007), pp. 541-545.*
Wu et al. "Efficient and Universal Scalable Video Coding". IEEE ICIP 2002, pp. 37-40.*

* cited by examiner

Primary Examiner — Christopher S Kelley
Assistant Examiner — Zhihan Zhou
(74) Attorney, Agent, or Firm — Robert D. Marshall, Jr.; Charles A. Brill; Frank D. Cimino

(57) ABSTRACT

This invention is a method of scalable video encoding and decoding. The scalable video encoding codes both a base layer and an enhanced layer having greater resolution and/or refresh rate. Upon decoding some enhanced layer pictures may be dropped to reach a best resolution and refresh rate within a target data rate. Upon encoding a key picture in at least one group of pictures forming the video is a combined base layer/enhanced layer key picture. Such a combined base layer/enhanced layer key picture cannot be dropped on decoding. This technique reduces drift in the decoder.

6 Claims, 7 Drawing Sheets

DRIFT REDUCTION FOR QUALITY SCALABLE VIDEO CODING

CLAIM OF PRIORITY

This application claims priority under 35 U.S.C. 119(a) from Indian Provisional Application No. 89/CHE/2010 filed Jan. 13, 2010.

TECHNICAL FIELD OF THE INVENTION

The technical field of this invention is quality scalable video coding, also known as signal-to-noise ratio (SNR) scalable video coding (SVC).

BACKGROUND OF THE INVENTION

Scalable Video Coding (SVC) is the name given to the extension Annex G of the H.264/MPEG4 AVC video compression standard. SVC is a technique that enables a video stream to be broken into multiple resolutions, quality levels and frame rates. In one embodiment, scalability refers to removal of parts of the video stream in order to adapt to various needs or preferences of end users as well as to varying terminal capabilities or network conditions. Applications of scalability include but are not limited to Internet Video, Video Telephony and wireless communication where bandwidth availability cannot be guaranteed. In video streaming application, a server usually serves a large number of users with different screen resolutions and network bandwidth. When the users screen is too small or the bandwidth between some users and the server is too narrow to support higher resolution sequences, spatial scalability coding provides different resolutions. This is turn helps the server accommodate different users with different bit rate or screen resolution capabilities.

SUMMARY OF THE INVENTION

This invention is a method of scalable video encoding and decoding. The scalable video encoding codes both a base layer and an enhanced layer having greater resolution and/or refresh rate. Upon decoding some enhanced layer pictures may be dropped to reach a best resolution and refresh rate within a target data rate. Upon encoding a key picture in at least one group of pictures forming the video is a combined base layer/enhanced layer key picture. Such a combined base layer/enhanced layer key picture cannot be dropped on decoding. This technique reduces drift in the decoder.

BRIEF DESCRIPTION OF THE DRAWINGS

These and other aspects of this invention are illustrated in the drawings, in which.

DETAILED DESCRIPTION OF PREFERRED EMBODIMENTS

Scalable Video Coding (SVC) is the name given to the extension Annex G of the H.264/MPEG4 AVC video compression standard. SVC is a technique that enables a video stream to be broken into multiple resolutions, quality levels and frame rates. In one embodiment, scalability refers to removal of parts of the video stream in order to adapt to various needs or preferences of end users as well as to varying terminal capabilities or network conditions. Applications of scalability include but are not limited to Internet Video, Video Telephony and wireless communication where bandwidth availability cannot be guaranteed. In video streaming application, a server usually serves a large number of users with different screen resolutions and network bandwidth. When the users screen is too small or the bandwidth between some users and the server is too narrow to support higher resolution sequences, spatial scalability coding provides different resolutions. This is turn helps the server accommodate different users with different bit rate or screen resolution capabilities.

Figure 1:
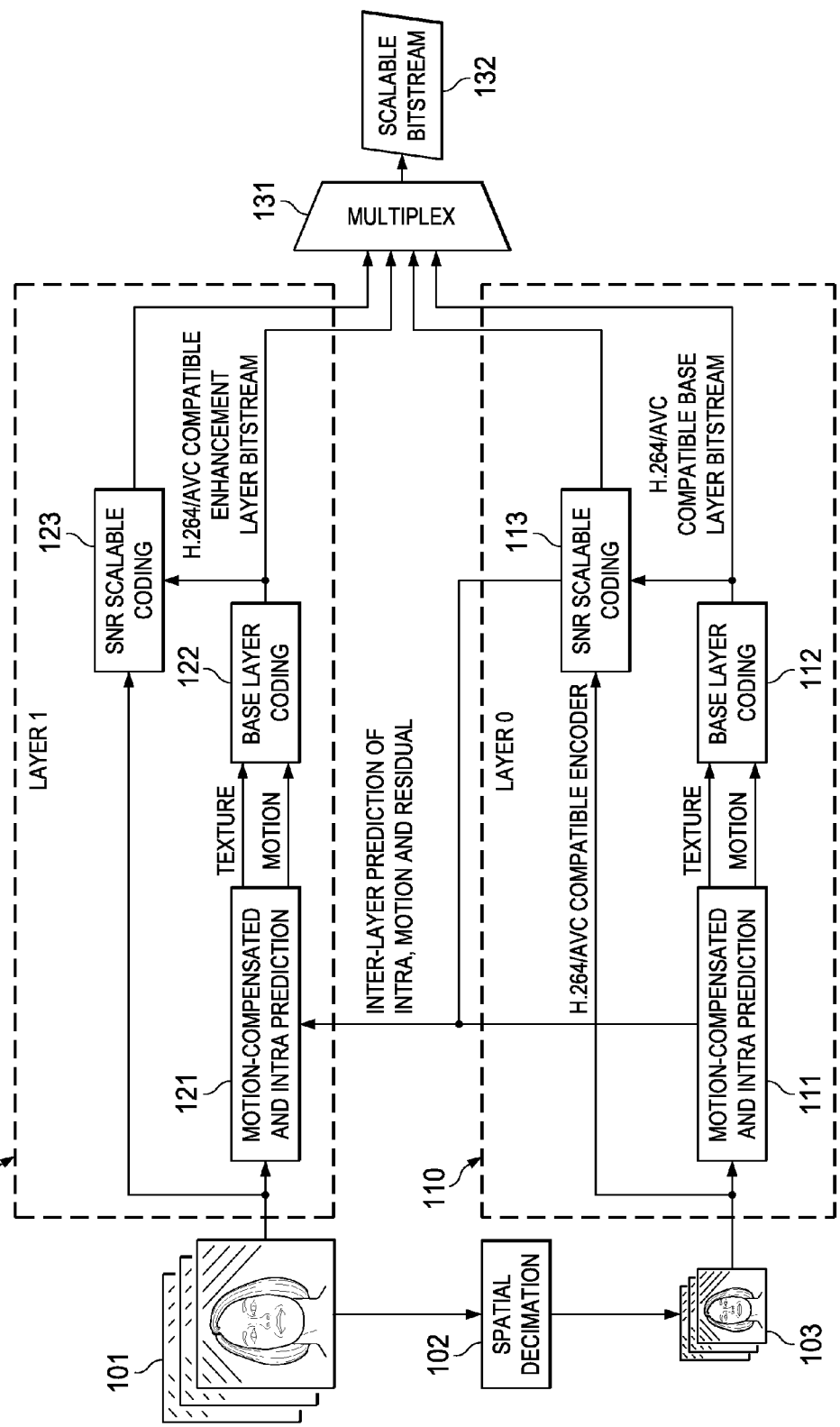
FIG. 1 is a block diagram of scalable video coding encoder structure in accordance with one embodiment of this invention.

FIG. 1 is a block diagram of a scalable video coding (SVC) encoder 100. SVC encoder 100 includes base layer (Layer 0) encoder 110 and enhancement layer (Layer 1) encoder 120. A full sized group of pictures (GPO) 101 supplies Layer 1 encoder 120. GOP 101 are sized via special decimation 102 into group of pictures (GOP) 103. GOP 103 are smaller in both spatial dimensions than GOP 101. GOP 103 supplies Layer 0 encoder 110.

Layer 0 encoder 110 includes motion-compensated and intra prediction unit 111, base layer coding unit 112 and signal to noise ratio (SNR) coding unit 113. Motion-compensated and intra prediction unit 111 forms motion-compensation and/or intra prediction on GOP 103 supplying texture and motion results to base layer coding unit 112. Base layer coding unit 112 generates a H.264/AVE compatible base layer bitstream supplied to both SNR coding unit 113 and multiplexer 131. Motion-compensated and intra prediction unit 111 also supplies inter-layer prediction of intra, motion and residual compensation for supply to both SNR coding unit 113 and motion-compensated and intra prediction unit 121. SNR coding unit 113 directly receives GOP 103 and receives the H.264/AVE compatible base layer bitstream and the inter-layer prediction of intra, motion and residual compensation from motion-compensated and intra prediction unit 111. SNR scalable coding unit 112 supplies corresponding SNR scalable coding data to multiplexer 131.

Layer 1 encoder 120 includes motion-compensated and intra prediction unit 121, base layer coding unit 122 and signal to noise ratio (SNR) coding unit 123. Motion-compensated and intra prediction unit 111 121 forms motion-compensation and/or intra prediction on GOP 101 including inter-layer prediction of intra, motion and residual compensation received from motion-compensation and intra prediction unit 111. Motion-compensated and intra prediction unit 121 supplies texture and motion results to base layer coding unit 122. Base layer coding unit 122 generates a H.264/AVE compatible base layer bitstream supplied to both SNR coding unit 123 and multiplexer 131. SNR coding unit 123 directly receives GOP 101 and receives the H.264/AVE compatible base layer bitstream and the inter-layer prediction of intra, motion and residual compensation from motion-compensated and intra prediction unit 121. SNR scalable coding unit 122 supplies corresponding SNR scalable coding data to multiplexer 131.

Multiplexer 131 receives bitstream data and SNR scaling coding data from both Layer 0 110 and Layer 1 120. Multiplexer 131 combines this data into scalable bitstream 132.

In SVC only the base layer is coded independently. Other layers are coded dependently with each following layer coded with respect to previous layers. This generates only a single bit-stream. Parts of this single bit stream can be extracted so that the resulting sub-streams form another valid bit-stream for a target decoder.

Video streams may be scalable by different modes such as temporal, spatial and quality. In spatial scalability describe the scaled bit stream represents the source content with a reduced picture size. In temporal scalability the scaled bit stream represents the source content with a reduced frame rate. In quality scalability the scaled bit stream provides the same spatio-temporal resolution as the source bit stream but with varying degrees of fidelity. Quality scalability is also referred as signal-to-noise ratio (SNR) scalability.

Temporal scalability codes the video sequence into two layers at the same spatial resolution, but different frame rates. A base layer is coded at a lower frame rate. An enhancement layer provides the missing frames to form a video with a higher frame rate. Coding efficiency of temporal scalability is high and is very close to non-scalable coding. This scalability can be used in range of diverse video applications from telecommunication to HDTV. In many cases the lower temporal resolution video systems may be either the existing systems or less expensive early systems. More sophisticated systems may then be introduced gradually. Temporal scalable bit-streams can be generated using hierarchical prediction structures. The number of supported temporal scalability levels is dependent on the specified Group of pictures (GOP) size. A GOP consists of a key picture and hierarchically predicted B pictures that are located between the key picture of a current GOP and the key picture of a previous GOP.

Spatial scalability involves generating two or more layers with different spatial resolutions from a single video source. FIG. 1 illustrates an example of spatial scalability. The base layer is coded providing a basic spatial resolution and the enhancement layer(s) employ the spatial interpolated base layer and carry higher or full spatial resolution of the video source. In each spatial layer, motion compensated prediction and intra prediction is employed as for single layer coding. But to improve coding efficiency in comparison to simulcast of different spatial resolutions, additional inter layer predictions are employed. This is explained in the next section. Spatial scalability supports interoperability between application using different video formats. For example the base layer can use QCIF (176×144) resolution at 4:2:0 while the enhancement layer can use CIF (356×288) resolution at 4:2:2.

In SNR (Quality) Scalability, the two layers are coded at the same rate and same spatial resolution but with different quantization accuracies. This is a special case of spatial scalability with identical picture size for the base layer and the enhancement layer. This is also known as Coarse Grain Scalability (CGS). The same interlayer prediction is employed as for spatial scalability. A variation of the CGS approach known as Medium Grain SNR Scalability (MGS) coding is also included in the SVC design. The difference of MGS from the CGS includes a modified high level signaling. This allows switching between different MGS layers in any access unit and key picture and allows adjustment of a suitable tradeoff between drift and enhancement layer coding efficiency for hierarchical prediction structures. A picture is called a key picture when all previously coded pictures precede this picture in display order. A key picture and all pictures temporally located between the key picture and a previous key picture form a group of pictures (GOP). The key pictures are either intra-coded or inter-coded using previous (key) pictures as reference for motion compensated prediction.

An SVC bit stream allows packets to be dropped to reduce spatial resolution and frame rate of quality. The MGS in SVC allows packets to be dropped arbitrarily to reduce bit rate. One or more enhancement layer packets can be dropped or kept. On the other hand, spatial scalability allows a layer to be dropped or kept.

Individual scalabilities can be combined to form mixed scalability for certain applications. With a properly configured scheme of combined scalability: the source content is encoded once for the highest requested resolution frame rate and bit rate; and at least one scalable bit stream is formed stream from which representations of lower resolution, lower frame rate and/or lower quality can be obtained by partial decoding. The main goal of Inter Layer prediction tool is use as much as lower layer information as possible for improving rate distortion efficiency of the enhancement layers.

In Inter Layer Intra Prediction, when a macroblock (MB) of the base layer (BL) is coded in Intra mode, the corresponding block of enhancement layer (EL) can use the reconstructed MB of the BL as the prediction signal. The reconstructed signal of the MB is up sampled via a one dimensional 4 tap finite impulse response (FIR) filters for the luminance component and via a bilinear filter for the chrominance component.

In Inter Layer Motion Prediction, since the motion vectors (MVs) of all the layers are highly correlated the MVs of the EL can be derived from those of the co-located blocks of the BL when both MBs of the BL and EL are coded in the inter mode. The associated MBs are scaled by a factor of 2 for the dyadic case. The MB portioning of the EL is obtained from the partitioning of the corresponding block of BL. For the obtained MB partitions the same reference indices of the corresponding MB of the BL is used.

In Inter Layer Residual Prediction, if the MV of the BL and EL are similar, coding efficiency can be improved when the residual of the MV of the BL is used to predict the MV of the EL. The residual prediction can be adaptively employed for MB prediction. The residual signal is up sampled using bilinear filter to predict the EL for dyadic case.

In Joint Layer Optimization all coding modes of every MB are examined and the resulting rate (R) and distortion (D) are calculated. Rate-Distortion optimization (RDO) techniques select a particular coding mode. The goal is to minimize the distortion D for a given rate $R_c$ by appropriate selection of coding parameters: namely Min{D} Subject to R≤Rc.

Figure 2:
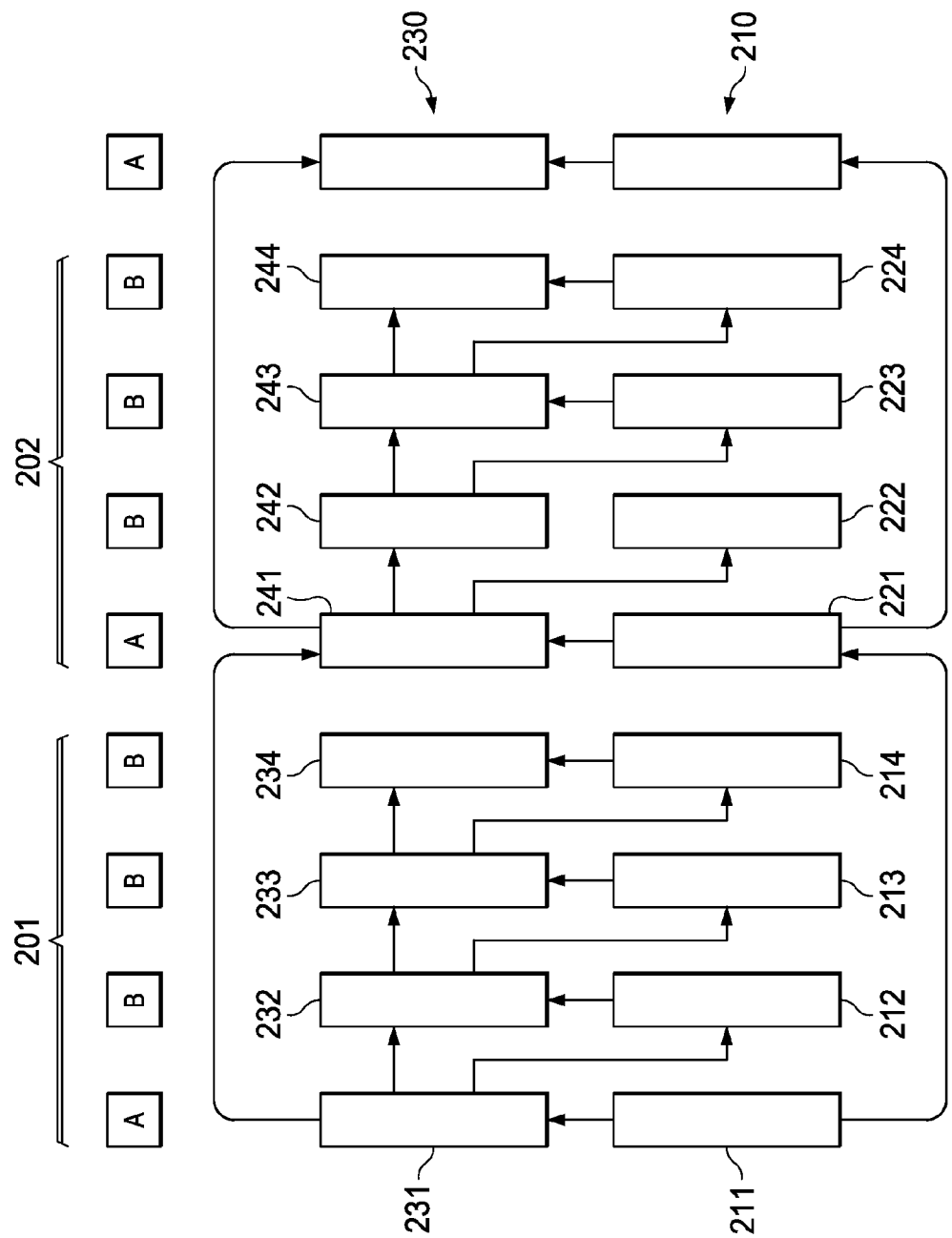
FIG. 2 is an exemplary illustration of a prediction structure for medium grain signal-to-noise scalability in accordance with the prior art.

FIG. 2 is an exemplary illustration of a prediction structure used for MGS in the prior art. The stream is coded with two quality layers/levels: a base layer/base quality; and an enhancement layer/enhancement quality. A first set of pictures represented by A, B, B, B form a first group of pictures (GOP) 201. A second set of pictures represented by A, B, B, B form a first group of pictures (GOP) 202. The size of GOP 201 and GOP 202 in the example FIG. 2 is 4. FIG. 2 illustrates BL pictures 210 and EL pictures 230. FIG. 2 illustrates the flow of data in picture prediction. Picture 231 is predicted based upon picture 211. Pictures 212 and 232 are predicted based upon picture 231. Pictures 213 and 233 are predicted based upon picture 232. Pictures 214 and 234 are predicted based upon picture 233. Picture 221 is predicted based upon picture 211. Picture 241 is predicted based upon pictures 221 and 231. Pictures 222 and 242 are predicted based upon picture 241. Pictures 223 and 243 are predicted based upon picture 242. Pictures 224 and 244 are predicted based upon picture 243. The quality of the A pictures (211, 231, 221 and 241) is extremely important for overall video quality of the sequence. These pictures are typically called as Key Pictures.

Figure 3:
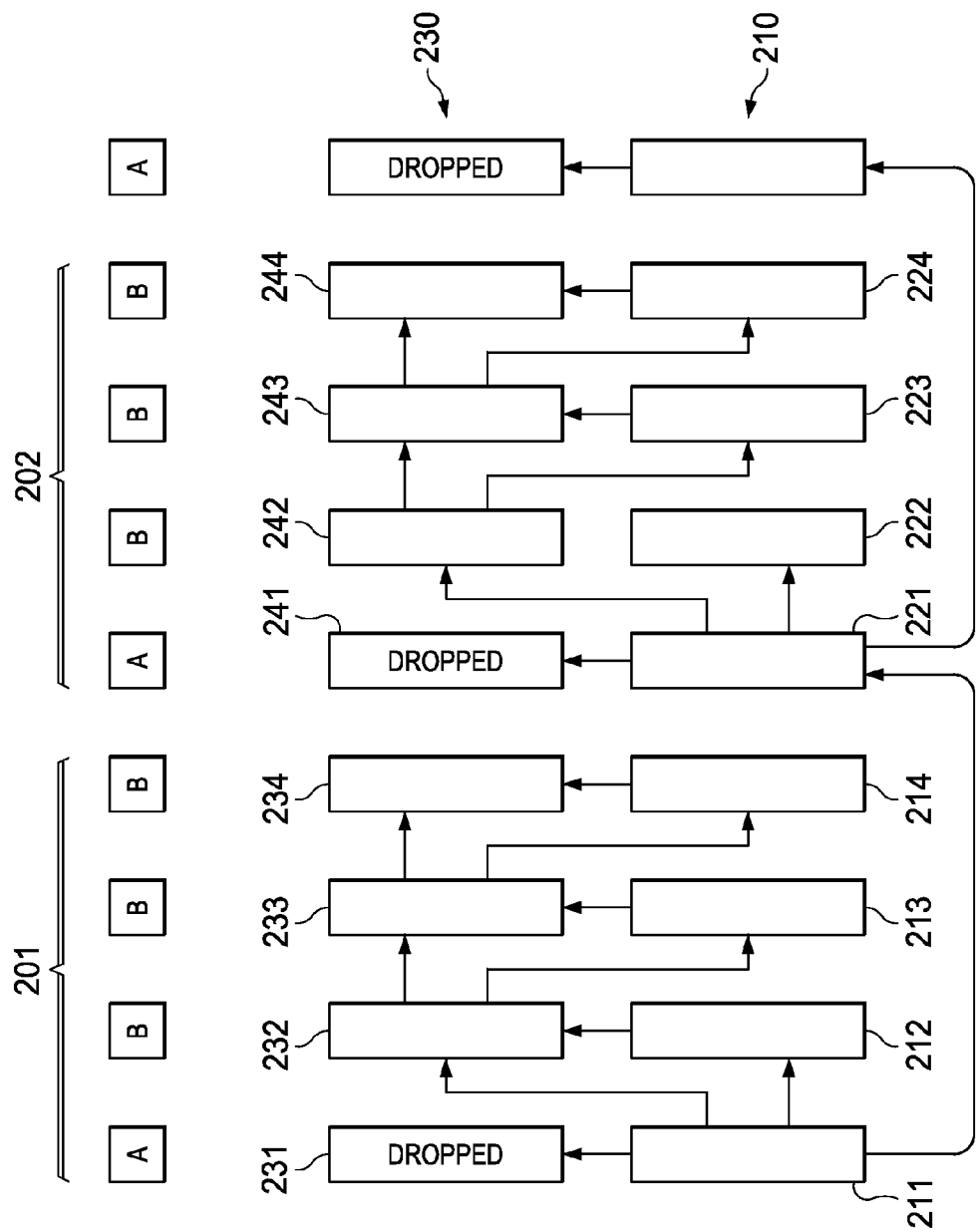
FIG. 3 is an exemplary illustration of a prediction structure for medium grain signal-to-noise scalability after enhancement layer key pictures are dropped in accordance with the prior art.

FIG. 3 illustrates an example valid scaled version of the stream of pictures illustrated in FIG. 2 (prior art). MGS allows enhancement layer packets to be dropped arbitrarily. Any picture which used to refer to the dropped packet would then refer to the quality layer below. However this creates a problem that is widely called as drift. Drift occurs when the decoder is not using the same reference picture as what the encoder used. FIG. 3 illustrates EL layer pictures 231 and 241 as dropped. Pictures 212 and 232 are now predicted from picture 211. Pictures 222 and 242 are now predicted from picture 221.

This can cause video quality artifacts that can propagate until a closed-loop prediction is restored. Such a closed-loop prediction is restored in an Intra frame that doesn't refer to any previous frame. Drift may be acceptable in MGS as long as it doesn't propagate for long. The propagation and hence the resulting increase of the drift is a more severe problem than the drift itself.

Table 1 shows Bjøntegaard delta (BD) bit rate difference with respect to independent encoding of layers of a MGS SVC bit stream before and after dropping enhancement layer key pictures as illustrated in FIG. 3. This independent coding is known as SIMULCAST. The change in BD bit rate is due to the quality loss and error propagation from the dropping of packets.

TABLE 1

| MGS BD bit rate change with respect to simulcast | MGS BD bit rate change after the enhancement layer key picture truncation |
|---|---|
| −22% | +3% |

Table 1 shows that dropping key pictures causes severe drift. In this example, the drift in terms of BD bit rate is 25% (from −22% to +3%).

Figure 4:
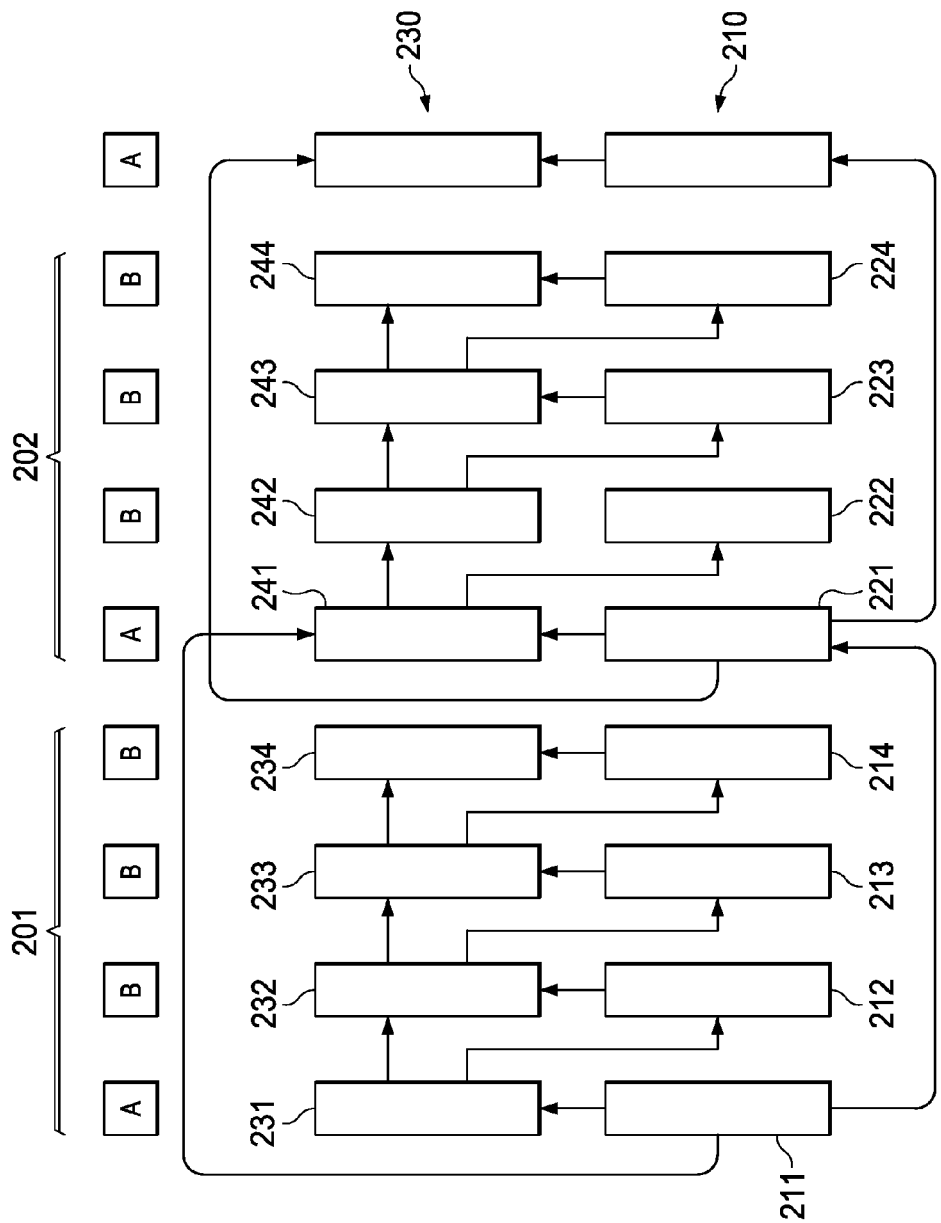
FIG. 4 is an exemplary illustration of a prediction structure for medium grain signal-to-noise scalability with base quality prediction in accordance with the prior art.
Figure 5:
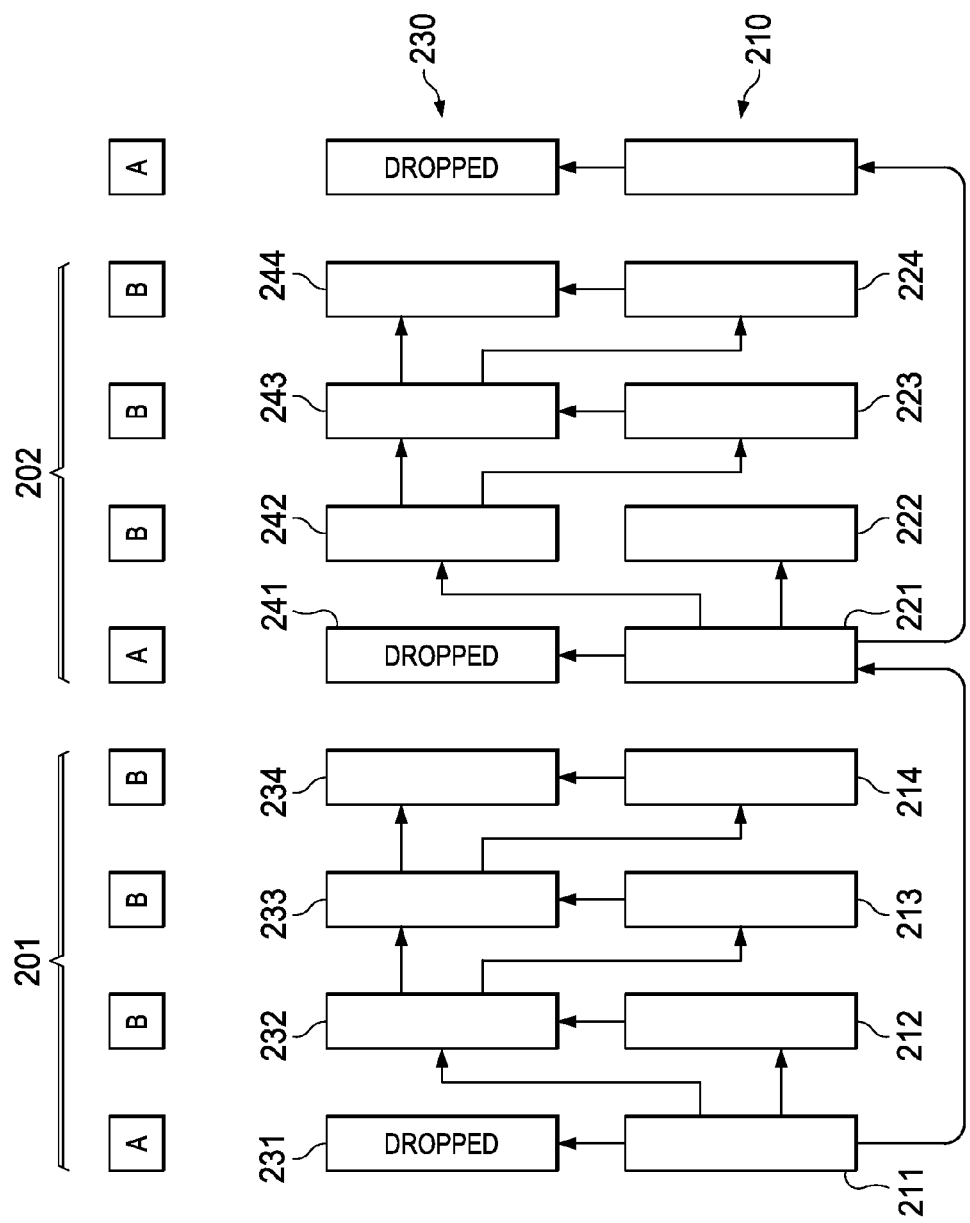
FIG. 5 is an exemplary illustration of a prediction structure for medium grain signal-to-noise scalability with base quality prediction after enhancement layer key pictures are dropped in accordance with the prior art.

FIG. 4 illustrates an alternate known in the prior art. The SVC uses a mechanism called as base quality prediction to contain drift. In this alternative a picture, typically a key picture, is predicted from a previous base quality picture. FIG. 4 illustrates EL picture 241 predicted from BL picture 211. FIG. 5 illustrates the prediction structure when the enhancement layer key pictures 231 and 241 are dropped. Pictures 212 and 232 are now predicted from picture 211. Pictures 222 and 242 are now predicted from picture 221. This is similar to the prediction structure shown in FIG. 3.

FIG. 5 shows that there is a drift in the second set of pictures (B) even in the alternative structure, but that drift is contained within the GOP and hence is not as severe as the case illustrated in FIG. 3. This MGS alternative provides a mechanisms for zero drift packet dropping if needed. This mechanism allows the second set of pictures (B) also to predict from base quality base picture. Using base quality key picture degrades the overall video quality since the highest quality of the key pictures are not used in the prediction.

Table 2 compares the video quality of with and without base quality predictions. The video quality is measured as a percentage bit rate change with respect to independent encoding of both the layers as separate H.264 streams, SIMULCAST. The GOP size used is 8 and the resolution of the video used is D1. A negative number shows bit rate reduction with respect to SIMULCAST, which is desirable. The numbers are highly sequence, resolution and GOP size dependent. These numbers are averaged over several sequences and bitrates.

TABLE 2

| MGS without base quality prediction | MGS with base quality prediction |
|---|---|
| −22% | −17% |

Table 2 shows that without base quality prediction MGS SNR scalability provides 22% bit rate savings. Notice however that there is a bit rate increase of about 5% (bit rate savings over SIMULCAST increases from −22% to −17%) while using base quality prediction.

There is a need to overcome drift propagation during packet drops in MGS and bit rate increase while using base quality prediction for MGS.

Figure 6:
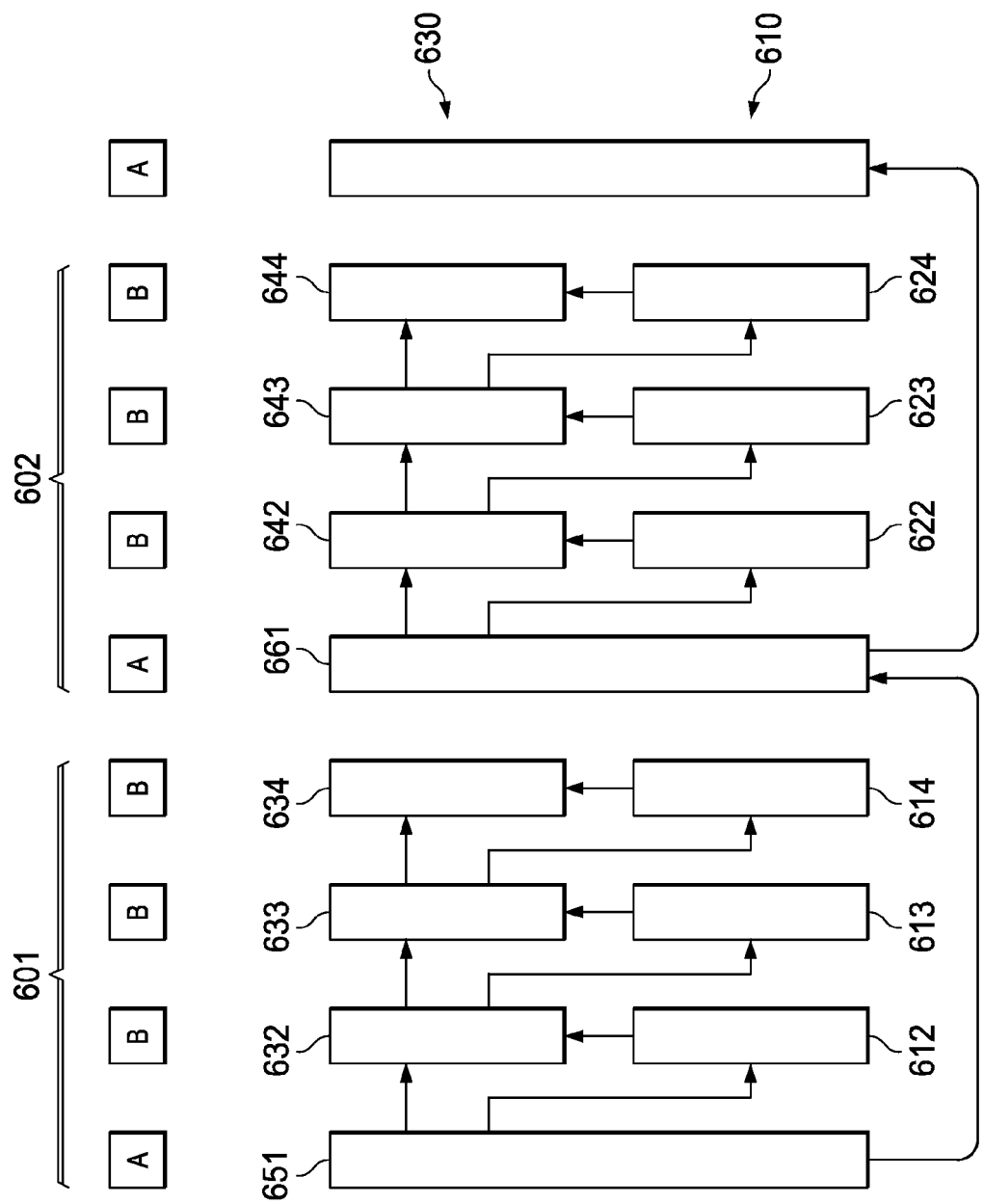
FIG. 6 is an exemplary illustration of combined key pictures for drift reduction in accordance with one embodiment of this invention.

FIG. 6 illustrates this invention employing combined key pictures for drift reduction. As shown in the prior art illustrated in FIG. 2 the stream is coded with two quality layers/levels: a base layer/base quality; and an enhancement layer/enhancement quality. A first set of pictures represented by A, B, B, B form a first group of pictures (GOP) 601. A second set of pictures represented by A, B, B, B form a first group of pictures (GOP) 602. The size of GOP 601 and GOP 602 is 4. FIG. 6 illustrates BL pictures 610 and EL pictures 630. FIG. 6 illustrates the flow of data in picture prediction. Pictures 612 and 632 are predicted based upon picture 651. Pictures 613 and 633 are predicted based upon picture 632. Pictures 614 and 634 are predicted based upon picture 633. Picture 661 is predicted based upon picture 651. Pictures 622 and 642 are predicted based upon picture 661. Pictures 623 and 643 are predicted based upon picture 642. Pictures 624 and 644 are predicted based upon picture 643. FIG. 6 differs from the prior art illustrated in FIG. 2 by having key pictures combined across layers. Separate pictures 211 and 231 are replaced in FIG. 6 with combined picture 651. Separate pictures 221 and 241 are replaced in FIG. 6 with combined picture 661. This combines the key A pictures in each GOP across layers 610 and 630.

This combination across layers has at least three advantages. FIG. 6 includes combined key pictures, which cannot be dropped according to the SVC bit stream rules. This means there is no drift that propagates to the next GOP. The picture quality used for the prediction of key pictures is the enhancement layer quality.

Figure 7:
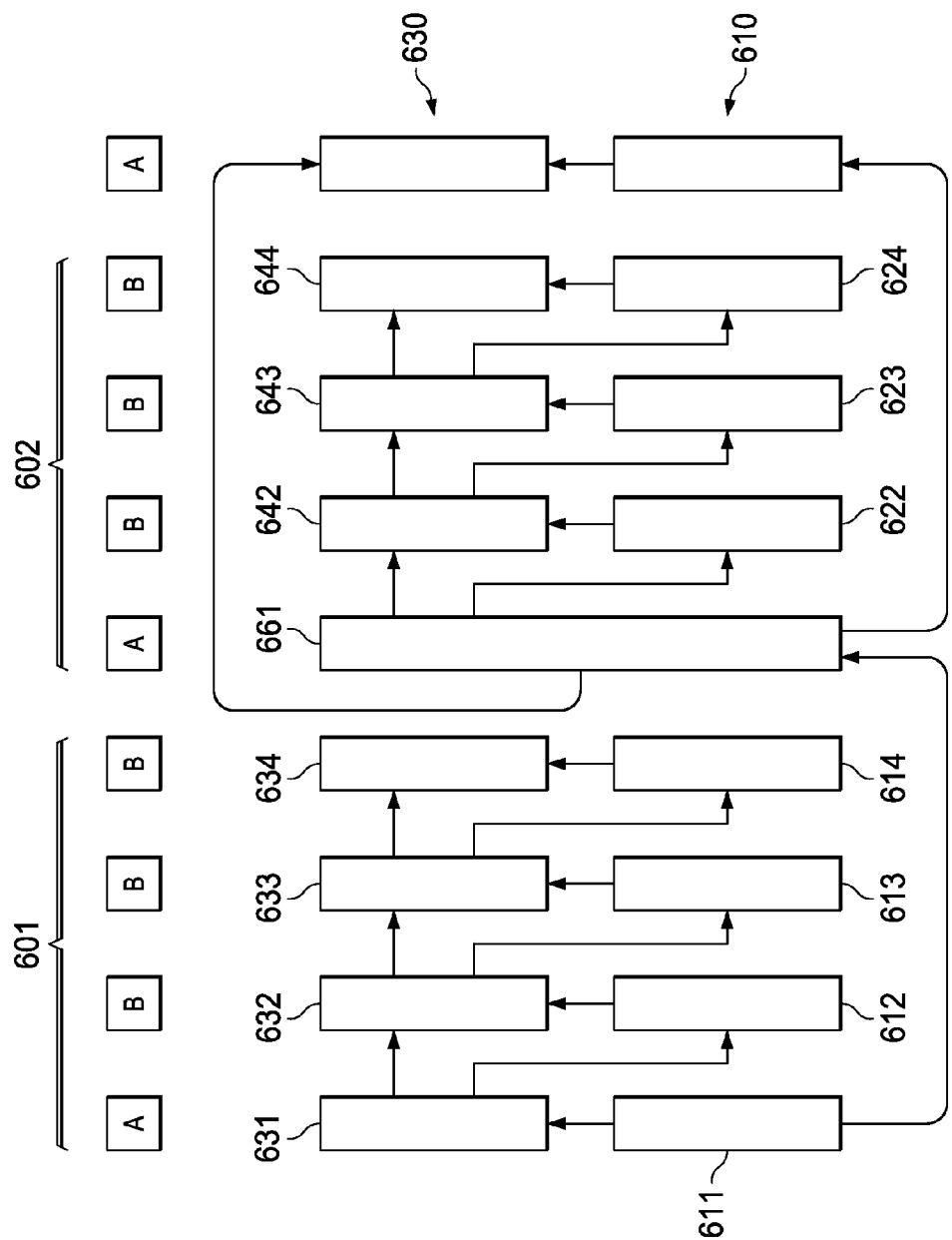
FIG. 7 is an exemplary illustration of combined key pictures for drift reduction in accordance with another embodiment of this invention.

The picture structure illustrated in FIG. 6 has a disadvantage. The base layer 610 bit rate is now higher than the prior art of FIG. 2 because the full bit rate taken by the key pictures is applied to the base layer. This reduces the possible bit rate adaptation that may be achieved by packet dropping. FIG. 7 illustrates a variant of the picture structure illustrated in FIG. 7. In FIG. 7 key pictures are combined across layers once in several GOPs. Picture 611 is predicted based upon picture 631. Pictures 612 and 632 are predicted based upon picture 621. Pictures 613 and 633 are predicted based upon picture 632. Pictures 614 and 634 are predicted based upon picture 633. Picture 661 is predicted based upon picture 611. Pictures 622 and 642 are predicted based upon picture 661. Pictures 623 and 643 are predicted based upon picture 642. Pictures 624 and 644 are predicted based upon picture 643. FIG. 7 differs from FIG. 6 in that not all key pictures are combined across layers. FIG. 7 includes separate pictures 611 and 631 and combined picture 661. This combines the key A pictures in some GOP across layers 610 and 630. The SVC bit stream rules permit picture 621 to be dropped but not picture 661. This provides more flexibility for bit rate adaptation than picture structure of FIG. 6. FIG. 7 illustrates one GOP with separate key pictures and one GOP with a combined key picture. Combining key pictures of every other GOP is not required. This invention could combine key pictures of every Nth GOPs where N is any integer 2 or greater.

Table 3 shows average result. The column "MGS with combined key picture" covers the every other GOP case illustrated in FIG. 7.

TABLE 3

| MGS without base quality prediction | MGS with base quality prediction | MGS with combined key picture |
|---|---|---|
| −22% | −17% | −28% |

Table 3 shows that the inventive solution is better than the existing solution for drift reduction because the bit rate savings compared to SIMULCAST increases from 17% to 28%.

It is noted that when key pictures are used, it gives a bit rate increase of 6.07% compared to without using key pictures. Further, if temporal layer 0 of the base and enhancement layer 1 of the base and enhancement layer is combined it gives a bit rate saving of 13.47% as compared to using separate key picture. Not shown in Table 3, using combined key pictures as illustrated in FIG. 7 reduces drift down to 0% from 12% using separate key pictures.

What is claimed is:

1. A method of scalable video data encoding comprising the steps of:
    encoding a video in groups of pictures in a base layer resolution and refresh rate;
    encoding the video in groups of pictures in an enhanced layer resolution and refresh rate, at least one of the enhanced layer resolution or refresh rate greater than the corresponding base layer resolution or refresh rate;
    determining a key picture for each group of pictures;
    forming a combined key picture from a corresponding base layer key picture and a corresponding enhanced layer key picture for at least one of the groups of pictures; and
    substituting the combined key picture for the corresponding base layer key picture and the corresponding enhanced layer key picture in an output video data stream.

2. The method of scalable video data encoding of claim 1, wherein:
    said step of forming a combined key picture for at least one of the groups of pictures combines the corresponding base layer key picture and the corresponding enhanced layer key picture for each group of pictures.

3. The method of scalable video data encoding of claim 1, wherein:
    said step of forming a combined key picture for at least one of the groups of pictures combines the corresponding base layer key picture and the corresponding enhanced layer key picture for every N group of pictures, where N is a positive integer.

4. A method of scalable video data decoding comprising the steps of:
    receiving a video in groups of pictures in a base layer resolution and refresh rate and in an enhancement layer resolution and refresh rate, at least one of the enhanced layer resolution or refresh rate greater than the corresponding base layer resolution or refresh rate, wherein a key picture for at least one of the groups of pictures is a combined base layer/enhanced layer key picture;
    decoding each picture in each group of pictures of the base layer;
    decoding each combined base layer/enhanced layer key picture for each group of pictures having a combined base layer/enhanced layer key picture; and
    decoding selective pictures in each group of pictures of the enhanced layer to provide a best resolution and refresh rate within a target data rate.

5. The method of scalable video data decoding of claim 4, wherein:
    if a group of pictures includes a combined base layer/enhanced layer key picture and a next group of pictures does not include a combined base layer/enhanced layer key picture predicting the key picture of the next group of pictures of the base layer and predicting the key picture of the next group of pictures of the enhanced layer from the combined base layer/enhanced layer key picture of the prior group of pictures.

6. The method of scalable video data decoding of claim 4, wherein:
    if a group of pictures includes a combined base layer/enhanced layer key picture and a next group of pictures includes a combined base layer/enhanced layer key picture predicting the combined key picture of the next group of pictures from the combined base layer/enhanced layer key picture of the prior group of pictures.

* * * * *